United States Patent [19]

Furumoto et al.

[11] Patent Number: 4,977,571
[45] Date of Patent: Dec. 11, 1990

[54] DYE LASER SOLUTION CIRCULATION SYSTEM

[75] Inventors: Horace W. Furumoto, Wellesley; Harry L. Ceccon, Boston; James C. Hsia, Andover, all of Mass.

[73] Assignee: Candela Laser Corporation, Wayland, Mass.

[21] Appl. No.: 174,729

[22] Filed: Mar. 29, 1988

[51] Int. Cl.⁵ .............................................. H01S 3/20
[52] U.S. Cl. ....................................................... 372/54
[58] Field of Search ........................ 372/58, 59, 55, 53

[56] References Cited

U.S. PATENT DOCUMENTS

| | | | |
|---|---|---|---|
| 3,740,665 | 6/1973 | Itzkan | 372/53 |
| 3,766,489 | 10/1973 | Rosenberg et al. | 372/53 |
| 3,805,187 | 4/1974 | Lempicki et al. | 372/53 |
| 3,868,591 | 2/1975 | Mumola et al. | 372/72 |
| 3,913,033 | 10/1975 | Tuccio et al. | 372/53 |
| 4,176,324 | 11/1979 | Aldag et al. | 331/94.5 |
| 4,197,512 | 4/1980 | Brenac | 372/35 |
| 4,364,015 | 12/1982 | Drake et al. | 372/53 |
| 4,610,014 | 9/1986 | Martinen et al. | 372/59 |
| 4,629,611 | 12/1986 | Fan | 372/59 |
| 4,674,099 | 6/1987 | Turner | 372/59 |
| 4,722,090 | 1/1988 | Haruta et al. | 372/59 |
| 4,740,982 | 4/1988 | Hakuta et al. | 372/59 |
| 4,779,284 | 10/1988 | Nissen | 372/59 |
| 4,803,693 | 2/1989 | Schramm | 372/59 |

Primary Examiner—Leon Scott, Jr.
Attorney, Agent, or Firm—Weingarten, Schurgin, Gagnebin & Hayes

[57] ABSTRACT

A dye laser fluid dye solution replenishment system in which the portion of the lasing fluid passing through the laser head which has been activated to a lasing condition is separated from the remainder of the unactivated dye solution and is separately restored before being recombined into the fluid flow path. The thus separated and degraded dye solution, representing only the degraded component of the flowing dye solution, is filtered to remove the degradation products and restored to the desired dye solution component concentrations. The thus restored solution is reinserted into the fluid flow path through the laser head.

35 Claims, 1 Drawing Sheet

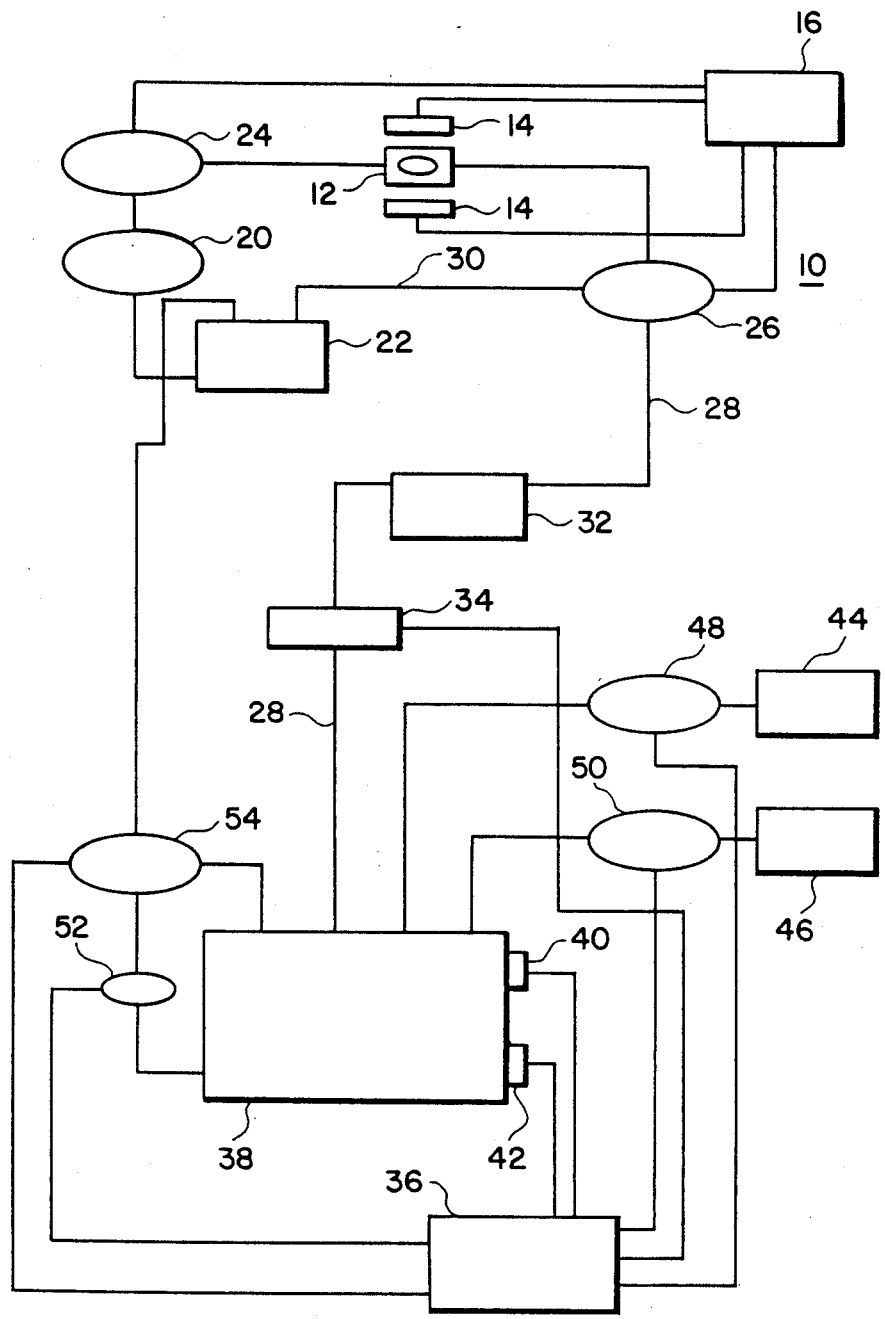

DYE LASER SOLUTION CIRCULATION SYSTEM

FIELD AND BACKGROUND OF THE INVENTION

The present invention relates to dye laser fluid replenishment systems. Dye lasers have been popular in the art for a number of years because of the ability to tune the wavelength of the laser output beam. Dye lasers are also capable of relatively high power output radiation levels. This permits dye lasers to be useful in many applications such as photo induced chemical and medical reactions, photo detection schemes including spectroscopy and pollution detection. One of the features of dye lasers is that the lasing medium is a fluid which is rapidly passed through the region of active lasing insuring quick replenishment between pulses of laser output. In this manner, a high power, high repitition rate beam can be achieved.

As a result of the lasing activation of the fluid dye solution, typically by high power flashlamp excitation, the lasable components, such as the dye molecules in the solution, are degraded with each high energy impulse of the flashlamp. Dye solutions also typically include components intended to quench the triplet state of the dye molecule which interferes with laser action. These quenching components of the dye solution can similarly be degraded by the lasing operation. In typical fluid dye lasers the solution contains a complex dye molecule such as a rhodamine dye along with a quenching component such as a cyclooctatetraen which provides triple excited state quenching. These components or others are typically provided as solutes in a water or organic (e.g. alcohol) base solution.

As a dye laser thus constructed may be intended to operate for protracted periods of time it is essential that a supply of usable dye solution be made continuously available for the laser. At high flow rates necessitated by high laser pulse repetition rates, a great deal of dye solution is passed through the laser head per minute. If this solution is recycled back through the laser, even though with each pulse only a portion of the solute has been degraded, by repeated cycling the dye solution becomes rapidly degraded to the point where laser performance, in terms of power output, can be reduced to unacceptable levels. If on the other hand a supply of fresh lasing fluid is provided in a sufficient volume to accommodate the laser over protracted periods, and the once utilized dye solution is discarded, the cost of operation becomes extremely high.

In one example of a mechanism to avoid this, shown in U.S. Pat. No. 4,364,015, the dye is recycled through the laser on a continuous basis from a reservoir. A small portion of the thus circulating dye solution is removed from the circuit on a continuous basis and processed in order to remove the degradation products while restoring the solute to a desired concentration level. This small extracted portion, as thus revitalized, is returned to the circuit. There thus results a replenishment of the fluid circulating through the laser with a fresh solution. While this will not prevent the flowing solution from degrading substantially, a steady state balance will be achieved in which degradation will not fall beyond a certain point and laser operation can be adjusted accordingly.

SUMMARY OF THE INVENTION

According to the teaching of the present invention, a system is disclosed for eliminating all degraded components in the flow loop of dye solution through a dye laser, maintaining a high state of dye solution freshness at all times without the inefficiency of discarding or reprocessing undegraded components of the dye solution.

In typical application, the present invention utilizes a fluid flow loop from a reservoir through a dye laser which is flashlamp pulse activated to provide a continuous stream of output radiation pulses. The pulse activation of the laser provides an output stream in the fluid flow path which contains partially degraded solute occurring in similar fluid pulses or segments in the flow conduit. A diverter valve is synchronized with the pulse activation of the laser, with appropriate delays, to divert each segment of the flashlamp radiated solute from the remaining flow path while continuing undegraded portions of the flow back into the circulating loop. The thus diverted and partially degraded solution is then processed to remove the degradation components, restore the fluid concentration of undegraded solute, and recycle the thus restored portion to the flow loop through the laser.

Typically, the diverted, partially degraded portion, is first filtered to remove the degraded portions in the dye and solvent molecules and/or quenching molecules to produce a solution of clean solute. This filtered solution is collected in a reservoir and periodically the concentration of solute is built back up to desired levels by applying to the reservoir concentrated dye and/or quenching components to achieve the desired concentration. The thus rehabilitated fluid is then returned to the main fluid supply loop through the laser, typically to the reservoir for the fluid pumped through the laser head.

By selectively stripping only the segments of fluid which have experienced degradation in the laser, the efficiency of the system is greatly enhanced by avoiding the discard or reprocessing of fluid components which are not in need of such restoration.

BRIEF DESCRIPTION OF THE DRAWING

These and other features of the present invention are more fully set forth below in the solely exemplary detailed description and accompanying drawing which shows a dye laser fluid replenishment system.

DETAILED DESCRIPTION

The present invention, which contemplates a system for restoring that component of a dye laser fluid flow which has been degraded by pulse activation of the dye laser while leaving untouched the remaining components of the fluid flow, is best illustrated with respect to the drawing. Shown there is a dye laser generally referenced at 10 comprising, as a laser head, a fluid chamber 12 which is pulse activated for lasing by light from flashlamps 14, under the control of a sequencer and flashlamp driver 16, to produce laser radiation along an output axis orthogonal to the page. Laser heads of this general design and others are known in the art and may, for example, be found in U.S. Pat. No. 4,176,324.

Fluid is caused to flow through the chamber 12 where it is activated by the radiation from the flashlamps 14 by a pump 20 which withdraws a lasable dye solution from a reservoir 22, passes it through a flow meter 24 and into the laser chamber 12. The fluid returns from the laser chamber 12 through a three way or "Y" valve 26. The fluid is diverted by the valve 26 onto a first path 28 or second path 30 under the control of the sequencer 16. For this purpose the sequencer 16 receives fluid flow indicia from the flow meter 24. In the normal state, the valve 26 returns the fluid from the chamber 12 to the reservoir 22 along the path 30. A predetermined interval after the generation of each laser pulse as produced by photo activation of the dye in the chamber 12 in response to flashlamp radiation produced by the sequencer 16, the valve 26 will be opened to divert the portion, and only the portion, of radiated fluid onto the first path 28.

The exact point for activating the valve 26 to divert the flow of laser fluid onto the path 28 is determined by a delay of sufficient magnitude to cause the unactivated fluid downstream of the activated segment from each flashlamp pulse to pass through the valve 26 onto the conduit 30. That delay is determined by the sequencer 16 in response to the operation of the flow meter 24 identifying the volume of fluid flow passing through the chamber 12. After a volume sufficient to clear out all of the unactivated dye preceding the pulse activated segment in the chamber 12 has passed, the valve 26 is then activated to apply the activated and thus partially degraded dye within the chamber 12 onto the conduit path 28. It is to be noted that several degraded segments may exist in the flow path simultaneously.

The pulses of degraded fluid on the path 28 are applied through a filter 32 which strips the solution of the solvent by-products in both the dye and/or any quench components of the solute. For this purpose an activated charcoal filter may be utilized or any other form of filter as appropriate. After passing through the filter 32, the fluid in the conduit 28 passes through a detector 34 for detection of the concentration of quench solute in the fluid. Typically the quench component will be a triple state quencher such as cyclooctatetraen which is detected utilizing UV light absorption as compared to a reference. The UV light absorption may utilize a small flashlamp as a light source and a light intensity detector the output of which, representing the level of quencher removed by the filter 32 and thus requiring restoration, is applied to a fluid restoration control unit 36.

After passing through the detector 34 the filtered fluid is applied to a reservoir 38. The reservoir 38 has a pair of sensors 40 and 42 which detect the volume of fluid in the reservoir 38 between upper and lower limits corresponding to each detector These detectors have their outputs supplied to the controller 36. The replenishment of lasable dye solute as well as quencher is provided from reservoirs 44 and 46 containing concentrated dye and quencher solutes. These are applied to the reservoir 38, through controlled valves 48 and 50 respectively, under the control of the controller 36. The controller 36 additionally controls a pump 52 which pumps the contents of the reservoir 38 through a valve 54 selectively into the main reservoir 22 or back into the reservoir 38 depending upon the control applied by the controller 36.

The controller 36 operates to await the detection by the sensor 40 of a full reservoir 38. At that point, the controller 36 applies dye solute from the reservoir 44 to replenish the dye removed by the filter 32, typically a predetermined volume, and to replenish quencher at a level to restore the quencher lost, as detected by the sensor 34, from the reservoir 46. In each case, the controller 36 activates the valves 48 and 50 to restore the lost volume. After this volume of dye solute and quencher have been added to the reservoir 38, the controller 36 closes the valves 48 and 50 and activates the pump 52 with the valve 54 directed to return the solution pumped from the reservoir 38 back into the reservoir 38 again. This pumping, activated for a predetermined interval of time, provides mixing of the solution within the reservoir 38 to insure complete uniformity after the addition of the concentrates from the reservoirs 44 and 46. After this mixing interval, the controller 36 switches the valve 54 to direct the fluid from the reservoir 38 back to the main laser fluid reservoir 22 until the sensor 42 detects depletion of the volume in the reservoir 38 to a predetermined level. At that point the controller 36 deactivates the pump 52 and returns the system to the state awaiting the filling of the reservoir 38 from the filtered fluid flowing in the path 28.

In addition or alternative to the use of an activated charcoal filter for the filter 32 other techniques may be utilized separately or in combination. Depending upon the desired or required degree of removal of degraded components without removal of undegraded dye components differing filter systems may be utilized. Among the alternative filtration techniques selective adsorption can be utilized with a high surface area solid support over which the fluid is flowed. Such supports include boneblack, silica, silicalite, alumina and zeolites. The selection of one or more of such adsorption supports is a function of the particular dye utilized and the degree of separation between degraded and undegraded components that is desired. In addition to selective adsorption, a size dependent support may be utilized operating on the principal that the degraded dye solution, particularly when exposure is to ultra violet excitation radiation and/or long duration excitation radiation, will experience a fragmentation into small molecular volumes compared to that of the dye molecule itself. These fragmentary molecules are then effectively removed utilizing a support, over which the fluid flows, with a pore size selectively chosen to adsorb the small molecular fragments while passing the larger still viable dye molecules. In addition, or in substitution to the above filter technique, a reverse osmosis membrane filter may be utilized.

Additionally or alternatively and with high effectiveness a redox or selective reduction-oxidation recovery technique may be utilized either in combination with the above disclosed recovery system or as an alternative to it. Such a redox system is added after or as a substitute for filter 32. It restores the degraded product utilizing an electrochemical cell that is dye molecule specific to induce a selective oxidation and reduction reaction in the recycle system between the valve 26 and the reservoir 38 that effectively restores the dye molecules or degraded components thereof to their original molecular compositions. In a redox system, the replenishment reservoirs 44 and/or 46 may not be needed if there is no net loss of dye or quench molecules.

The above described system for efficient dye restoration in a dye laser provides for an improvement in efficiency in dye laser fluid treatment by focussing dye restoration procedures on only that portion of the flow path which has been exposed to degrading photoexcitation radiation and providing complete or near complete restoration. Alternatives to the implementation disclosed above may be utilized to accomplish the same or similar results and are intended to be within the scope of the invention which is solely defined in the following claims.

We claim:

1. A pumped active medium replenishment system for replenishing laser fluid after it has been degraded by activation comprising:
   means for causing laser fluid to flow from a fluid source through a utilization chamber having means for periodically activating said laser fluid within the chamber, wherein during the activation period one or more laser fluid components are degraded by activation, interspersed with periods during which said laser fluid is not activated and not degraded, said utilization chamber having a laser fluid exit from which laser fluid continuously exits said utilization chamber after flowing therethrough;
   means for intercepting the laser fluid exiting said utilization chamber, and for operating in synchronism with said means for periodically activating the laser fluid, for separating laser fluid exiting said utilization chamber into first and second output paths, said first output path containing the laser fluid activated by said activating means and said second output path containing fluid substantially unactivated by said activating means;
   means for returning laser fluid in said second path to said laser fluid source;
   means for reconditioning laser fluid in said first path to substantially restore said laser fluid to its condition prior to activation by said activating means and for returning the reconditioned laser fluid to the laser fluid source.

2. The system of claim 1 wherein said laser fluid is photo-activatable and said activating means includes means for photo-activating said laser fluid.

3. The system of claim 2 wherein said activating means includes means for activating said laser fluid to a lasing condition.

4. The system of claim 3 wherein said laser fluid includes a lasable dye solution.

5. The system of claim 2 wherein said activating means includes a flashlamp.

6. The system of claim 1 wherein said means for separating into first and second output paths includes a "Y" valve.

7. The system of claim 6 wherein said sequencer means activates said "Y" valve at a predetermined time interval which is subsequent to the periodic activation of said laser fluid whereby the activated laser fluid component is selectively diverted by said "Y" valve to said first path.

8. The system of claim 1 wherein said means for reconditioning said laser fluid includes:
   means for removing degraded components in the laser fluid in said first path;
   means for replacing the removed components in the laser fluid in said first fluid path; and
   means for returning the laser fluid with replaced components to said source.

9. The system of claim 8 wherein said means for removing degraded components includes a filter.

10. The system of claim 8 wherein said means for replacing laser fluid components includes:
    means for collecting laser fluid in said first path subsequent to removal of degraded components;
    means for adding to the collected laser fluid replacement components; and
    means for periodically applying to said source the collected laser fluid with replacements.

11. The system of claim 10 wherein said adding means includes means for adding activatable components and quenching components to said laser fluid.

12. The system of claim 10 wherein said applying means includes means for mixing laser fluid in said collecting means with replacement components prior to applying the collected laser fluid to said source.

13. The system of claim 8 wherein said filter including one or more filters selected from the group consisting of an activated charcoal filter, a selected adsorption filter, a size exclusion filter, a reverse osmosis membrane in an osmotic filter.

14. The system of claim 1 wherein said reconditioning means includes an oxidation reduction cell.

15. A pumped dye solution replenishment system for a dye laser comprising:
    means for causing dye solution to flow from a source through a laser head having flashlamp means for periodically photo-activating dye solution within the head to a lasing condition wherein one or more dye solution components are degraded as a result of photo-activation, interspersed with periods during which said solution is not activated and not degraded, said head having a solution exit from which dye solution continuously exits said head after flowing therethrough;
    controlled valve means for interception the solution exiting said head and for operating in synchronism with said flashlamp means for periodically photo-activating the solution, for separating solution exiting said head into first and second output paths, said first output path containing the solution degraded by said photo-activating means and said second output path containing solution substantially undegraded;
    means for returning undegraded solution in said second path to said source;
    means for reconditioning solution in said first path to substantially restore said solution to its condition prior to degradation and for returning the reconditioned solution to the fluid source.

16. The system of claim 15 wherein said controlled valve means includes a "Y" valve.

17. The system of claim 16 wherein said means for separating includes means for operating said "Y" valve at a predetermined time interval subsequent to the periodic activation of said solution whereby the degraded solution component is selectively separated and diverted by said "Y" valve to said first path.

18. The system of claim 15 wherein said means for reconditioning said solution includes:
    means for removing degraded components in the solution in said first path;
    means for replacing the removed components in the solution in said first path; and
    means for returning the solution with replaced components to said source.

19. The system of claim 18 wherein said means for removing degraded components includes a filter.

20. The system of claim 18 wherein said means for replacing solution components includes;
    means for collecting solution in said first path subsequent to removal of degraded components;
    means for adding to the collected solution replacement components; and means for periodically applying to said source the collected solution with replacements.

21. The system of claim 20 wherein said adding means includes means for adding dye components and quenching components to said solution.

22. The system of claim 20 wherein said applying means includes means for mixing solution in said collecting means with replacement components prior to applying the collected solution to said source.

23. The system of claim 18 wherein said filter includes one or more filters selected from the group consisting of an activated charcoal filter, a selected adsorption filter, a size exclusion filter, a reverse osmosis membrane in an osmotic filter.

24. The system of claim 15 wherein said reconditioning means includes an oxidation reduction cell.

25. A method for medium replenishment comprising the steps of:
   causing fluid to flow from a fluid source through a utilization chamber having means for periodically activating a fluid within the chamber, said means for activating said fluid causing one or more fluid components to be degraded, interspersed with periods during which said fluid is not activated and not degraded, said utilization chamber having a fluid exit from which fluid continuously exits said utilization chamber after flowing therethrough;
   intercepting the fluid exiting said utilization chamber, and, separating fluid exiting said utilization chamber into first and second output paths synchronously with the periodic activation of the fluid, said first output path containing the fluid activated by said activating means and said second output path containing fluid substantially unactivated by said activating means;
   returning fluid in said second path to said fluid source;
   reconditioning fluid in said first path to substantially restore said fluid to its condition prior to activation; and
   returning the reconditioned fluid to the fluid source.

26. The method of claim 25 wherein said separating step includes the step of delaying a time interval subsequent to the periodic activation of said fluid whereby substantially only the activated fluid component is separated to said first path.

27. The method of claim 25 wherein said reconditioning step includes:
   removing degraded components in the fluid in said first path;
   replacing the removed components in the fluid in said first fluid path; and
   returning the fluid with replaced components to said source.

28. The method of claim 27 wherein said replacing step includes:
   collecting fluid in said firs path subsequent to removal of degraded components;
   adding to the collected fluid replacement components; and
   periodically applying to said source the collected fluid with replacements.

29. The method of claim 28 wherein said adding step includes adding activatable components and quenching components to said fluid.

30. A method for dye solution replenishment in a dye laser comprising the steps of:
   causing dye solution to flow from a source through a laser head having flashlamp means for periodically photo-activating a dye solution within the head to a lasing condition wherein one or more solution components are degraded as a result of photoactivation by said flash lamp means, interspersed with periods of time during which said solution is not activated, said head having a solution exit from which dye solution continuously exits said head after flowing therethrough;
   intercepting the solution exiting said head;
   separating solution exiting said head into first and second output paths, said first output path containing the solution degraded by said activating means and said second output path containing solution substantially undegraded;
   returning undegraded solution in said second path to said source;
   reconditioning solution in said first path to substantially restore said solution to its condition prior to degradation; and
   returning the reconditioned solution to the fluid source.

31. The method of claim 30 wherein said reconditioning step includes:
   removing degraded components in the solution in said first path;
   replacing the removed components in the solution in said first path; and
   returning the solution with replaced components to said source 32. The system of claim 30 wherein said step of replacing solution components includes;
   collecting solution in said first path subsequent to removal of degraded components;
   adding to the collected solution replacement components; and
   periodically applying to said source the collected solution with replacements.

33. The method of claim 32 wherein said adding step includes adding dye components and quenching components to said solution.

34. The method of claim 32 wherein said applying step includes mixing solution with replacement components prior to applying the collected solution to said source.

35. The method of claim 30 wherein said separating step includes the step of delaying a predetermined time interval subsequent to said periodic photoactivation of dye solution wherein substantially only the activated fluid component is separated to said first path.

* * * * *